(12) United States Patent
Wang

(10) Patent No.: US 9,339,828 B1
(45) Date of Patent: May 17, 2016

(54) PERCUSSIVE SPRINKLER

(71) Applicant: Cheng-An Wang, Chang Hua Hsien (TW)

(72) Inventor: Cheng-An Wang, Chang Hua Hsien (TW)

(*) Notice: Subject to any disclaimer, the term of this patent is extended or adjusted under 35 U.S.C. 154(b) by 64 days.

(21) Appl. No.: 14/524,560

(22) Filed: Oct. 27, 2014

(51) Int. Cl.
| | |
|---|---|
| *B05B 15/00* | (2006.01) |
| *B05B 3/08* | (2006.01) |
| *A01G 25/00* | (2006.01) |
| *B05B 15/06* | (2006.01) |
| *B05B 1/20* | (2006.01) |
| *B05B 3/16* | (2006.01) |
| *B05B 3/02* | (2006.01) |
| *B05B 3/04* | (2006.01) |
| *B05B 13/04* | (2006.01) |
| *B08B 9/093* | (2006.01) |

(52) U.S. Cl.
CPC . *B05B 3/08* (2013.01); *A01G 25/00* (2013.01); *B05B 1/20* (2013.01); *B05B 3/02* (2013.01); *B05B 3/025* (2013.01); *B05B 3/044* (2013.01); *B05B 3/0418* (2013.01); *B05B 3/0445* (2013.01); *B05B 3/0486* (2013.01); *B05B 3/165* (2013.01); *B05B 13/0405* (2013.01); *B05B 15/00* (2013.01); *B05B 15/061* (2013.01); *B05B 15/062* (2013.01); *B05B 15/063* (2013.01); *B08B 9/0936* (2013.01)

(58) Field of Classification Search
CPC ............ B05B 3/08; B05B 3/165; B05B 1/20; B05B 3/02; B05B 3/025; B05B 15/00; B05B 15/061; B05B 15/062; B05B 15/063; B05B 3/0418; B05B 3/0486; B05B 3/044; B05B 3/0445; B05B 13/0405; B08B 9/0936; A01G 25/00
USPC .................... 239/222.13, 222.15, 225.1, 227, 239/231–233, 239, 240, 242, 273, 276, 264, 239/289, 566
See application file for complete search history.

(56) References Cited

U.S. PATENT DOCUMENTS

| | | | | |
|---|---|---|---|---|
| 2,475,537 A | * | 7/1949 | Ashworth | B05B 3/0468 239/240 |
| 2,570,605 A | * | 10/1951 | Miroslav | B05B 3/0468 239/222.15 |
| 4,379,523 A | * | 4/1983 | Schanz | B05B 3/044 239/222.13 |
| 5,511,727 A | * | 4/1996 | Heren | B05B 3/044 239/242 |
| 7,448,558 B2 | * | 11/2008 | Wang | B05B 1/1654 239/242 |
| 8,910,887 B2 | * | 12/2014 | Helmsderfer | B05B 1/02 239/289 |

* cited by examiner

*Primary Examiner* — Steven J Ganey
(74) *Attorney, Agent, or Firm* — Egbert Law Offices, PLLC

(57) ABSTRACT

A percussive sprinkler includes a base having a supporting portion and a mounting portion. An inlet pipe is secured on the mounting portion for guiding water into the percussive sprinkler. A guide frame is rotatably mounting on the inlet pipe. A watering tube is mounted on the inlet pipe and communicates with the inlet pipe for spraying water from the inlet pipe. The guide frame has a tube coupling extending therefrom near the inlet pipe and the watering tube is mounted onto the tube coupling such that the eater from the inlet pipe firstly sprays out from the watering tube before flowing to the spray head of the guide frame.

9 Claims, 7 Drawing Sheets

PERCUSSIVE SPRINKLER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a sprinkler, and more particularly to a horizontal percussive sprinkler that has a shortened water path.

2. Description of Related Art Including Information Disclosed Under 37 CFR 1.97 and 37 CFR 1.98.

Conventional sprinkling products in accordance with the prior art include the types of hand-held sprinkling gun, upright sprinkler, placing sprinkler and hanging sprinkler. As usual, the placing sprinkler is put or selectively secured on the ground for easily changing the position thereof.

The conventional sprinkling elements of the placing sprinkler have various types, such as rotating type or reciprocally swing type. The conventional sprinkler usually uses a gear box for reciprocally swinging the spray head thereof. However, the gear box for conventional sprinkler is too expensive and complicated such that some sprinkler manufacturers provide a percussive sprinkler that uses a percussive spraying head for changing the spraying angle of the spraying hole thereof and a steering control device for limiting the angle range of the spraying hole.

However, the conventional percussive sprinkler has the disadvantages as follow. The spraying element of the conventional percussive sprinkler is elongated such that the water current firstly passes the guide frame and flow to the spraying tube. As a result, the guiding tube is elongated and complicated and the leaking probability is raised. In addition, the opposite ends of the spraying tube of the conventional sprinkler are respectively limited by the guiding element and the base thereof such that irrigating type is unchanged.

The present invention has arisen to mitigate and/or obviate the disadvantages of the conventional sprinklers.

BRIEF SUMMARY OF THE INVENTION

The main objective of the present invention is to provide an improved percussive sprinkler that has a watering tube disposed before a spray head thereof for promoting an irrigating effect.

To achieve the objective, the percussive sprinkler in accordance with the present invention comprises a base including a supporting portion and a mounting portion extending from the supporting portion. An inlet pipe extends from the mounting portion a pipe coupling element is mounted into the mounting portion and communicating with the inlet pipe. A guide frame is rotatably disposed onto the mounting portion and includes a tubular element rotatably received in the pipe coupling element. A spray head is formed on a free end of the tubular element. A percussive frame is pivotally mounted onto the spray head for reciprocally impacting the spray head. A resilient member is disposed in the guide frame and connected to the percussive frame for providing restitution force to the percussive frame. A steering control device is sleeved on the tubular element for controlling the steering range of the guide frame. The steering control device includes a limiting element rotatably sleeved on the tubular element and a linkage secured on the guide frame, wherein the limiting element and the linkage respectively correspond to the tubular element of the guide frame for adjusting and controlling the swing range of the guide frame. A watering tube is mounted onto the guide frame from spraying water from the inlet pipe. The water tube is divided into an insertion portion and a horizontal portion, wherein multiple spray holes are defined in the horizontal portion. The insertion portion communicates with a tube coupling that radially extends from the tubular element such that the water tube is swung with the guide frame and the water tube communicates with the tubular element. As a result, the water from the inlet pipe firstly flows into the watering tube and waters through the spray holes before flowing into the spray head.

Further benefits and advantages of the present invention will become apparent after a careful reading of the detailed description with appropriate reference to the accompanying drawings.

DETAILED DESCRIPTION OF THE INVENTION

Figure 1:
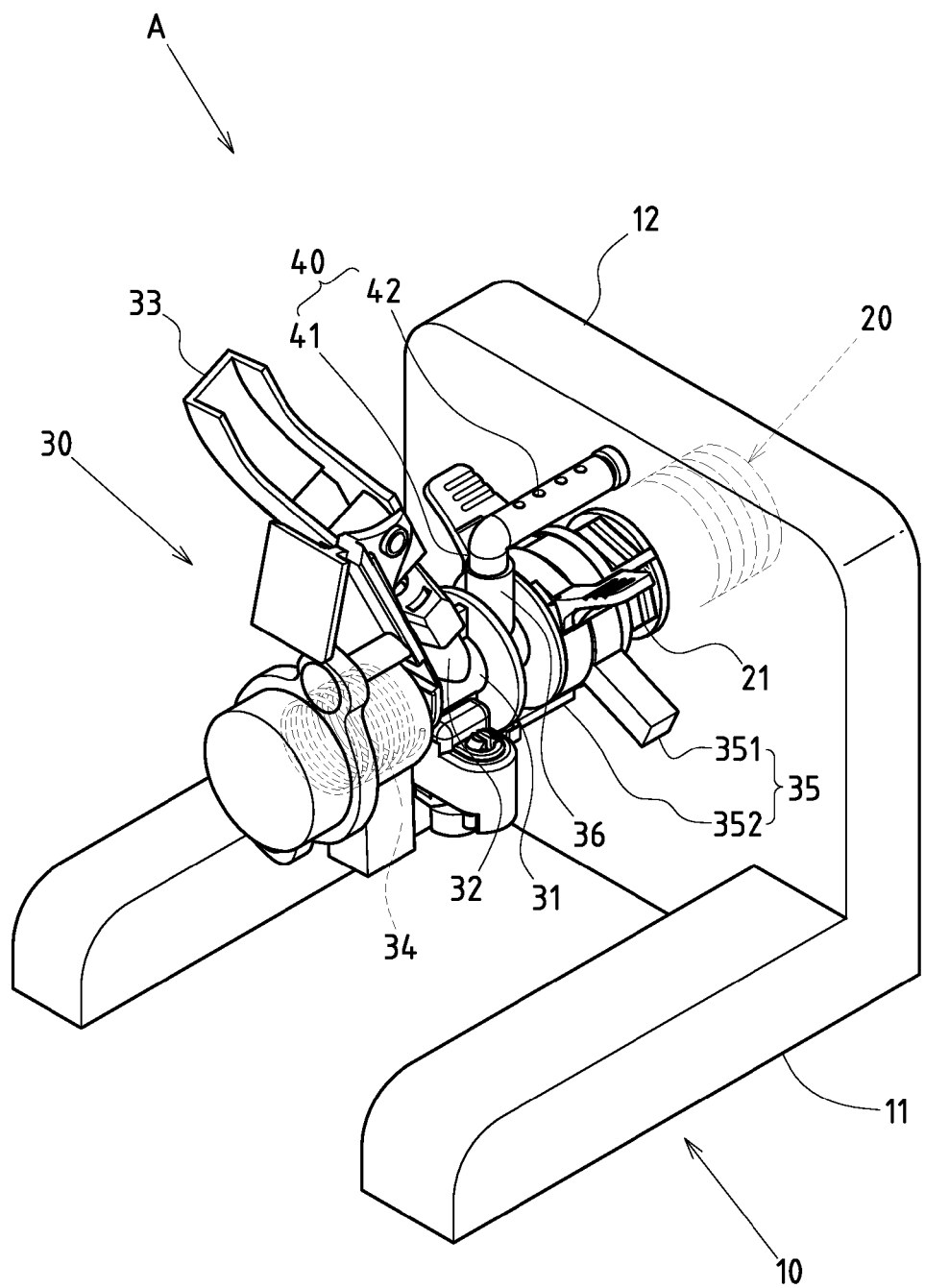
FIG. 1 is a perspective view of a percussive sprinkler in accordance with the present invention.
Figure 2:
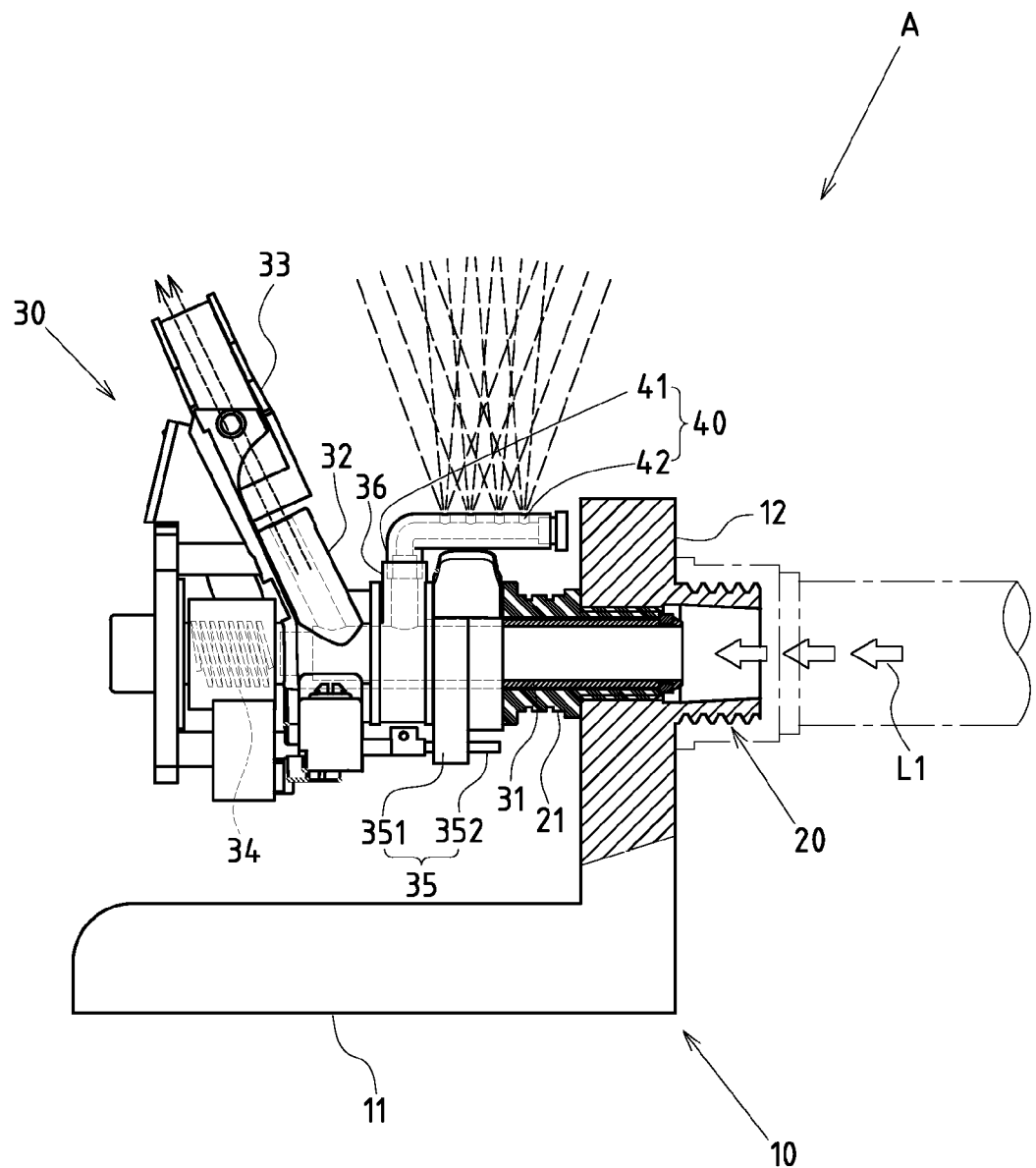
FIG. 2 is a side plan view of the percussive sprinkler in FIG. 1.
Figure 3:
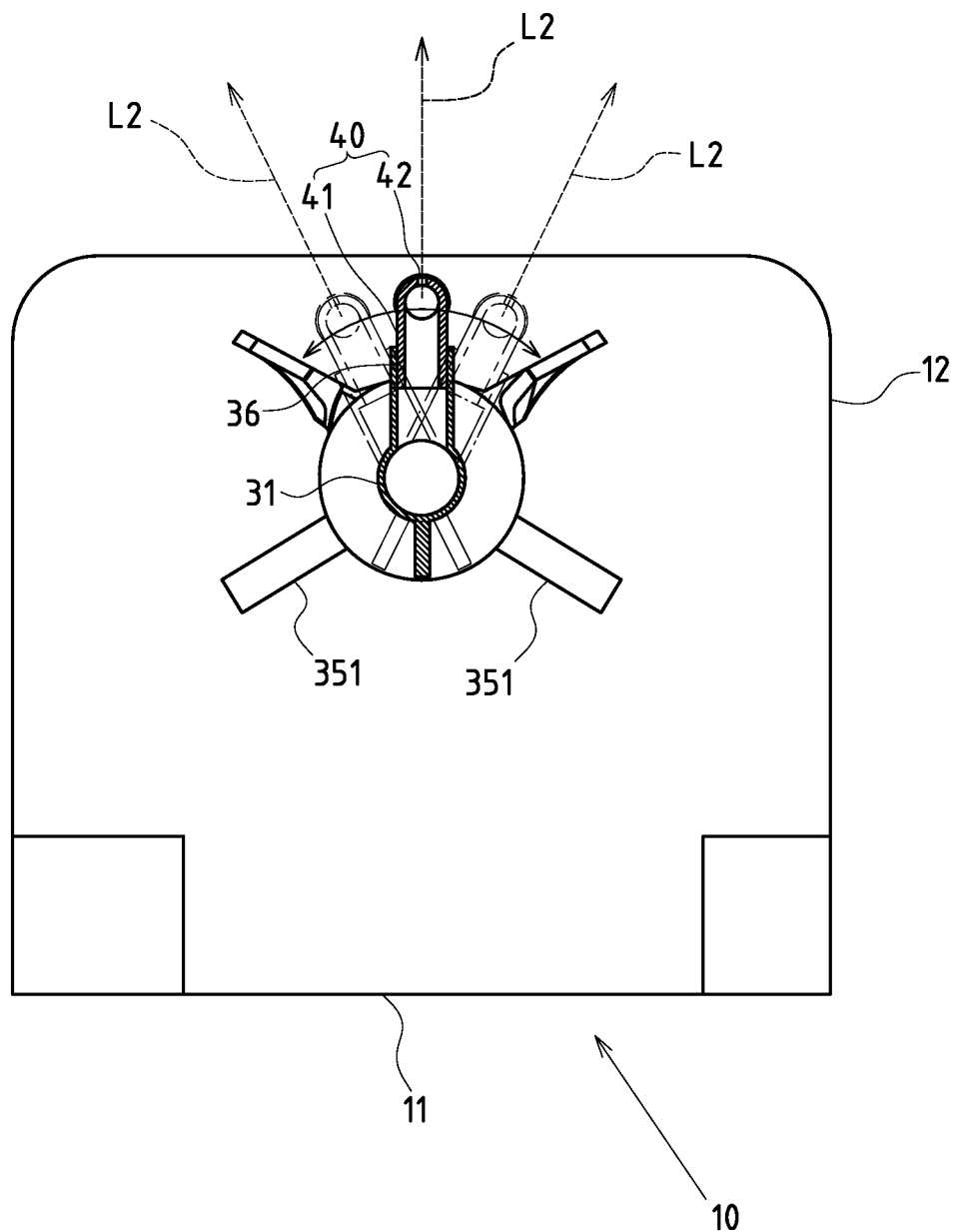
FIG. 3 is a front plan view of the percussive sprinkler in FIG. 1.

Referring to the drawings and initially to FIGS. 1-3, a percussive sprinkler A in accordance with the present invention comprises a base 10 including a supporting portion 11 and a mounting portion 12 extending from the supporting portion 11. An inlet pipe 20 extends from the mounting portion 12 a pipe coupling element 21 is mounted into the mounting portion 12 and communicating with the inlet pipe 21. A guide frame 30 is rotatably disposed onto the mounting portion 12 and includes a tubular element 31 rotatably received in the pipe coupling element 21. A spray head 32 is formed on a free end of the tubular element 31. A percussive frame 33 is pivotally mounted onto the spray head 32 for reciprocally impacting the spray head 32. A resilient member 34 is disposed in the guide frame 30 and connected to the percussive frame 33 for providing restitution force to the percussive frame 33. A steering control device 35 is sleeved on the tubular element 31 for controlling the steering range of the guide frame 30. The steering control device 35 includes a limiting element 351 rotatably sleeved on the tubular element 31 and a linkage 352 secured on the guide frame 30, wherein the limiting element 351 and the linkage 352 respectively correspond to the tubular element 31 of the guide frame 30 for adjusting and controlling the swing range of the guide frame 30. A watering tube 40 is mounted onto the guide frame 30 from spraying water from the inlet pipe 20. The water tube 40 is divided into an insertion portion 41 and a horizontal portion (not numbered), wherein multiple spray holes 42 are defined in the horizontal portion. The insertion portion 41 communicates with a tube coupling 36 that radially extends from the tubular element 31 such that the water tube 40 is swung with the guide frame 30 and the water tube 40 communicates with the tubular element 31. As a result, the water from the inlet pipe 20 firstly flows into the watering tube 40 and waters through the spray holes 42 before flowing into the spray head 32. In the preferred embodiment of the present invention, the insertion portion 41 is detachably inserted into the tube coupling 36.

By the structures described above, the water is guided into the guide frame 30 by the inlet pipe 20, along the direction of the arrow L1 in FIG. 1. Then, the water flow into the tubular element 31 of the guide frame and spray out by the spray head 32. The percussive frame 33 is swung and compresses the resilient member 34 when the water is sprayed out of the spray head 32 and acting on the percussive frame 33. The percussive frame 33 impacts the guide frame 30 to make the guide frame 30 being rotated relative to the base 10 when the percussive frame 33 moves back to its original position due to the restitution force of the resilient member 34. The steering range of the percussive frame 33 is controlled by the steering control device 35. The tube coupling 36 extends from the tubular element 31 of the guide frame 30 near the inlet pipe 20 and the insertion portion 41 of the water tube 40 is inserted into the tube coupling 36. Consequently, the water, in the tubular element, firstly flows into the watering tube 40 and spraying through the spray holes 42 before flowing into the spray head 32, and the water tube 40 swings with the tubular element 31 of the guide frame 30, along the direction of the arrow L2 in FIG. 3, for achieving the purpose of irrigation when the water flows through the spray head 32 and impacts the percussive frame 33. The irrigating water path in accordance with the present invention is front of the spray head 32 not over the percussive frame 33 such that that the waterway is shorter relative to that of the conventional percussive sprinkler. In addition, the structure of the waterway of the present invention is simplified such that the probability of water-clock and the manufacturing cost are reduced.

The insertion portion 41 of the watering tube 40 can be detached from the tube coupling 36 on the tubular element 31 of the guide frame 30 such that the tube coupling 36 in accordance with the present invention is suitable to watering tubes 40 with various types. In addition, the tube coupling 36 extends from a top portion of the tubular element 31 of the guide frame 30 and there is no other structure disposed over the watering tube such that the watering tube 40 can be easily detached from the tube coupling 36 when the watering tube 40 is designed as a detachable type. Consequently, the manufacturer can provide various watering tubes 40 for different irrigating effects.

Figure 7:
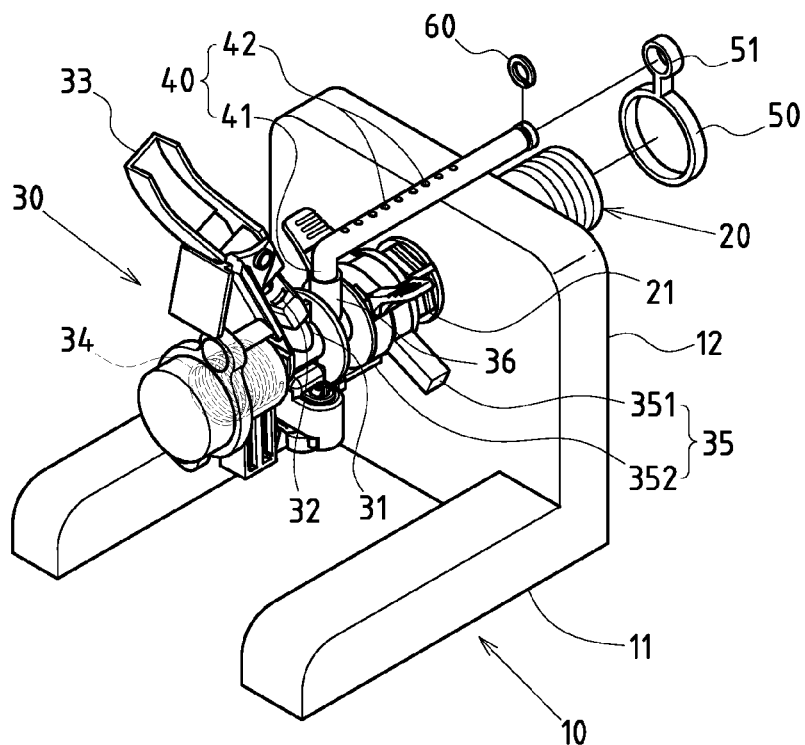
FIG. 7 is a perspective view of a fourth embodiment of the percussive sprinkler in accordance with the present invention.
Figure 8:
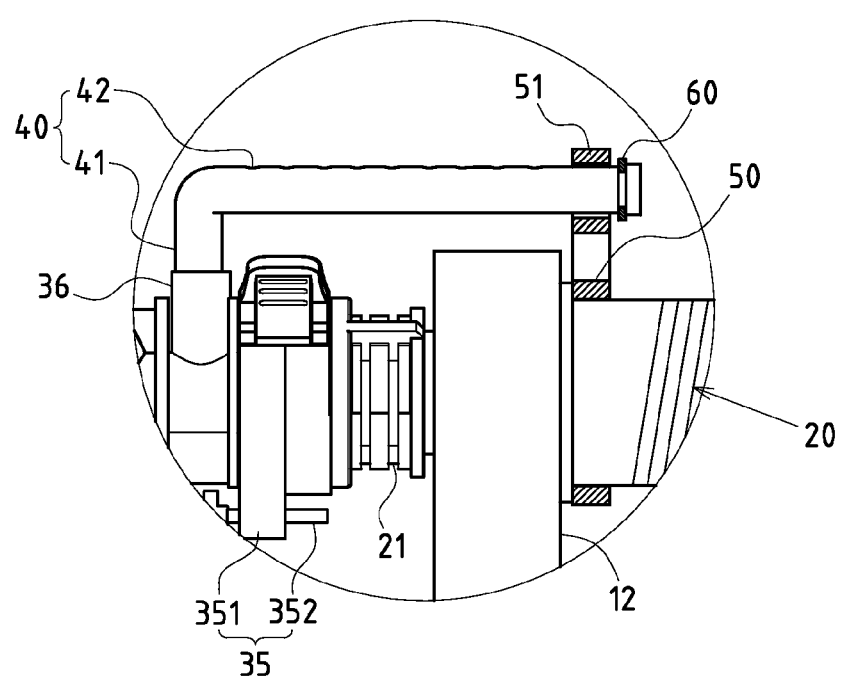
FIG. 8 is a side enlarged plan view of the percussive sprinkler in FIG. 7.

With reference to FIG. 1, the watering tube 40 extends toward the inlet pipe 20. Further with reference to FIGS. 7 and 8, in the preferred embodiment, the watering tube 40 can extend over the mounting portion 12 above the inlet pipe 20. A ring 50 is rotatably sleeved on the inlet pipe 20 and a holder 51 is connected to the ring 50, wherein the watering tube 40 extends through the holder 51 and further includes an endpiece 60 secured on a free end of the watering tube 40 to prevent the watering tube 40 from being detached from the holder 51. In the preferred embodiment of the present invention, the ring 50 and the holder 51 can support the free end of the watering tube 40 to prevent the free end of the watering tube 40 from vibration due to the water pressure.

Figure 4:
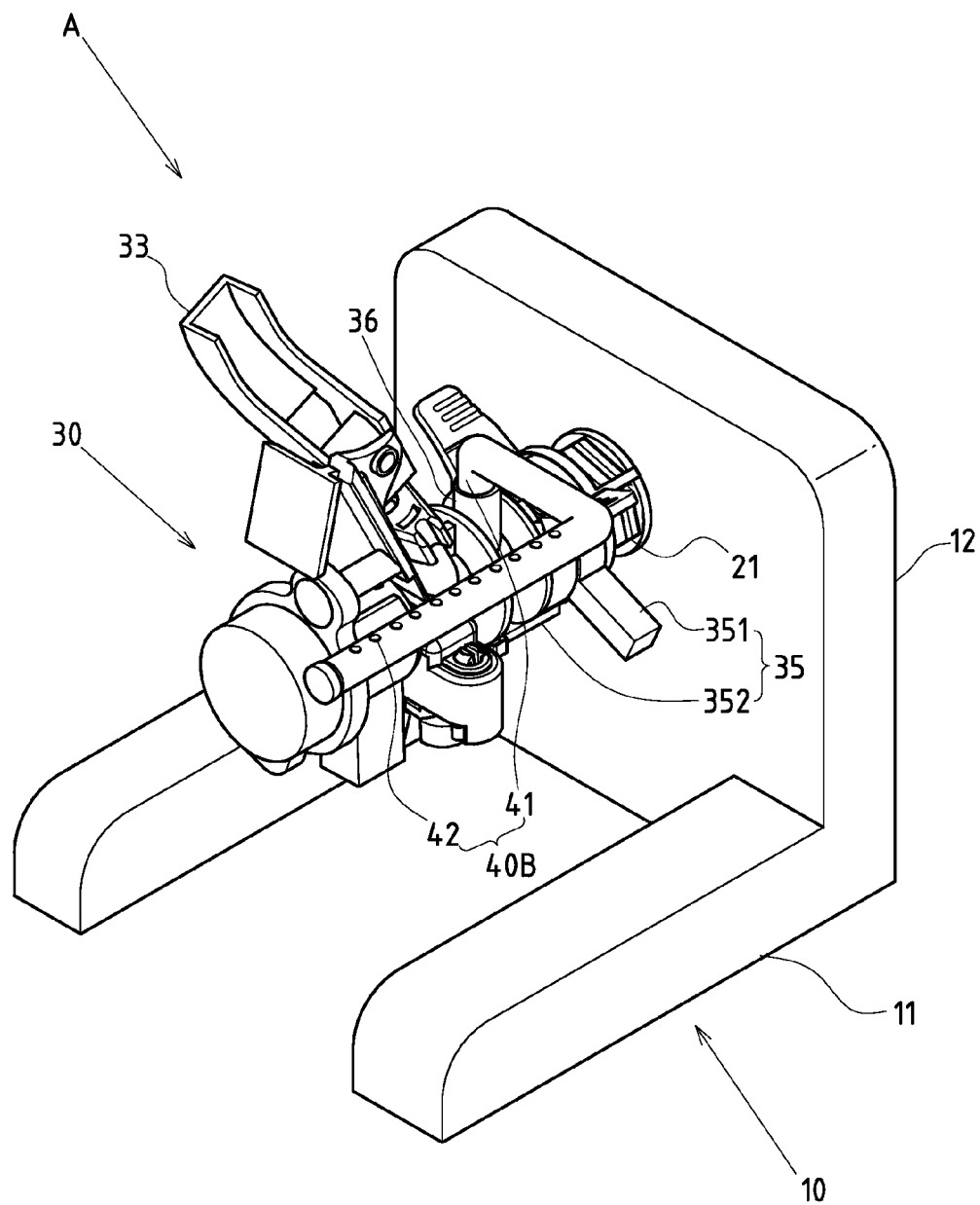
FIG. 4 is a perspective view of a second embodiment of the percussive sprinkler in accordance with the present invention.

With reference to FIG. 4, the watering tube 40B extends toward the percussive frame 33 lateral to the tubular element 31. In addition, the watering tube 40/40B can be further designed to be curved or spiral.

Figure 5:
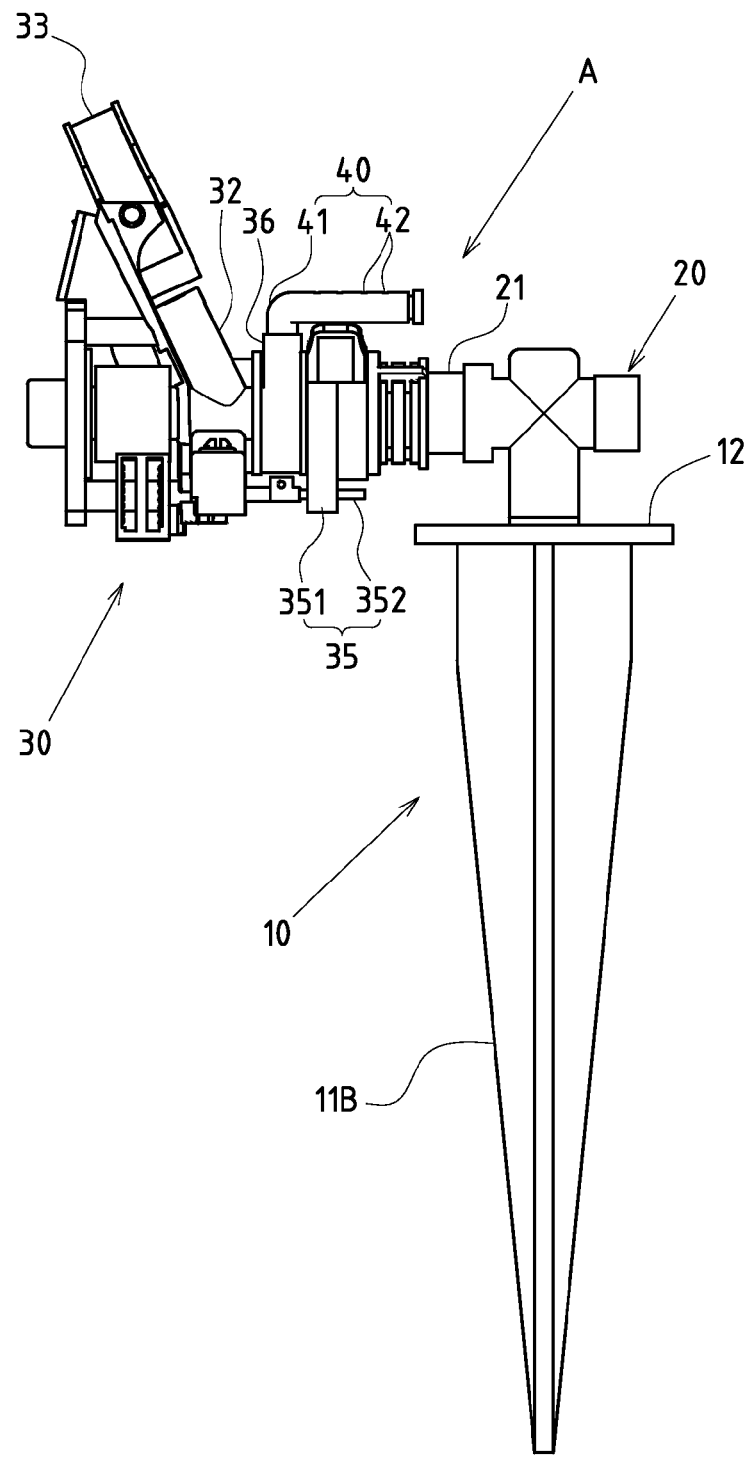
FIG. 5 is a side plan view of a third embodiment of the percussive sprinkler in accordance with the present invention.

The supporting portion 11 of the base 10 is used as a seat that is disposed on the ground. With reference to FIG. 5, the supporting portion 11B of the base is a sharpened element that is stably inserted into the ground for supporting the inlet pipe 20 and the guide frame 30.

Figure 6:
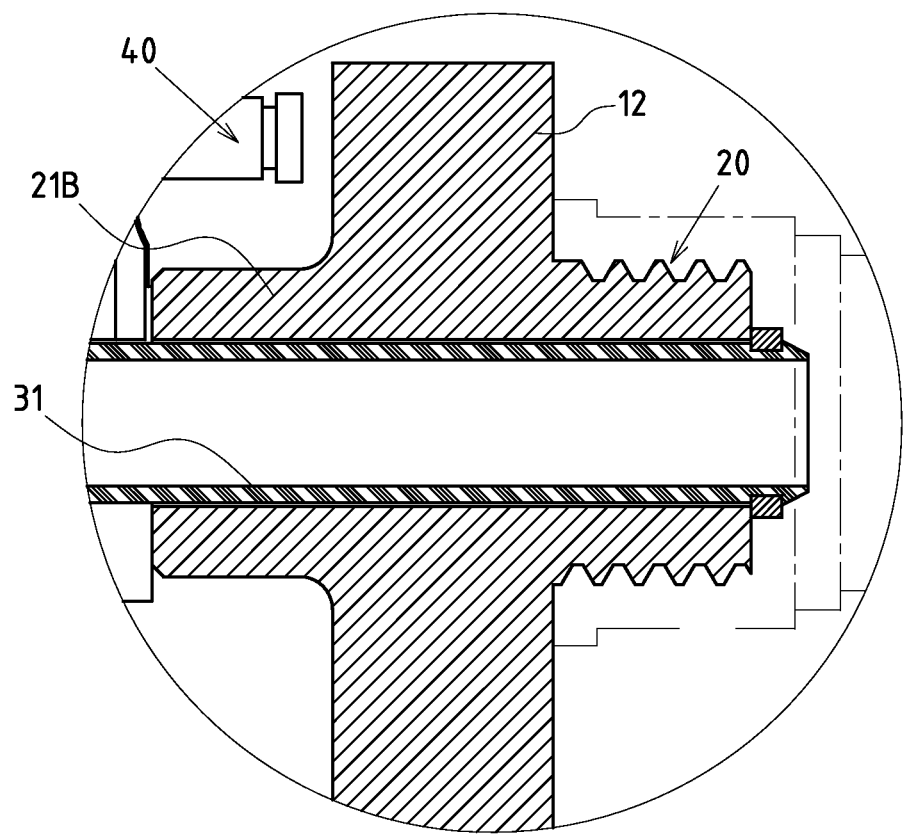
FIG. 6 is an enlarged plan view for showing the inlet pipe integrally formed with the base.

With reference to FIG. 2, the pipe coupling element 21 is secured on the mounting portion 12 of the base 10 by screw structures. With reference to FIG. 6, the pipe coupling element 21B is integrally formed with the mounting portion 12 of the base 10.

As described above, the tube coupling 36 in accordance with the present invention extends from the tubular element 31 near the inlet pipe 20 for receiving the insertion portion 41 of the watering tube 40 such that the water from the inlet pipe 20 firstly flows into the watering tube 40 and waters through the spray holes 42 before flowing into the spray head 32. As a result, the total length and the probability of water-clock of the percussive sprinkler are reduced. In addition, the watering tube 40 can be replaced relative to the user's purpose and the irrigating type for promoting the using scope of the percussive sprinkler in accordance with the present invention.

Although the invention has been explained in relation to its preferred embodiment, it is to be understood that many other possible modifications and variations can be made without departing from the spirit and scope of the invention as hereinafter claimed.

I claim:

1. A percussive sprinkler comprising a base including a supporting portion and a mounting portion extending from the supporting portion, an inlet pipe extending from the mounting portion, a pipe coupling element mounted into the mounting portion and communicating with the inlet pipe, a guide frame rotatably disposed onto the mounting portion and including a tubular element rotatably received in the pipe coupling element, a spray head formed on a free end of the tubular element, a percussive frame pivotally mounted onto the spray head for reciprocally impacting the spray head, a resilient member disposed in the guide frame and connected to the percussive frame for providing restitution force to the percussive frame, a steering control device sleeved on the tubular element for controlling the steering range of the guide frame, the steering control device including a limiting element rotatably sleeved on the tubular element and a linkage secured on the guide frame, wherein the limiting element and the linkage respectively correspond to the tubular element of the guide frame for adjusting and controlling the swing range of the guide frame, a watering tube mounted onto the guide frame for spraying water from the inlet pipe, the watering tube divided into an insertion portion and a horizontal portion, wherein multiple spray holes is defined in the horizontal portion, the insertion portion communicating with a tube coupling that radially extends from the tubular element such that the watering tube is swung with the guide frame and the watering tube communicates with the tubular element, the water from the inlet pipe firstly flowing into the watering tube and watering through the spray holes before flowing into the spray head.

2. The percussive sprinkler as claimed in claim 1, wherein the insertion portion of the watering tube is detachably inserted into the tube coupling.

3. The percussive sprinkler as claimed in claim 2, wherein the horizontal portion of the watering tube extends toward the inlet pipe.

4. The percussive sprinkler as claimed in claim 3, wherein the supporting portion of the base is a sharpened element that is stably inserted into the ground for supporting the inlet pipe and the guide frame.

5. The percussive sprinkler as claimed in claim 3, wherein the pipe coupling element is secured on the mounting portion of the base by screw structures being integrally formed with the mounting portion of the base.

6. The percussive sprinkler as claimed in claim 3, wherein the watering tube extends over the mounting portion above the inlet pipe, and a ring is rotatably sleeved on the inlet pipe and a holder is connected to the ring, wherein the watering tube extends through the holder and further includes an end-piece secured on a free end of the watering tube to prevent the watering tube from being detached from the holder.

7. The percussive sprinkler as claimed in claim 2, wherein the horizontal portion of the watering tube extends toward the percussive frame.

8. The percussive sprinkler as claimed in claim 7, wherein the supporting portion of the base is a sharpened element that is stably inserted into the ground for supporting the inlet pipe and the guide frame.

9. The percussive sprinkler as claimed in claim 7, wherein the pipe coupling element is secured on the mounting portion of the base by screw structures being integrally formed with the mounting portion of the base.

\* \* \* \* \*